US010005957B2

(12) United States Patent
Wang et al.

(10) Patent No.: US 10,005,957 B2
(45) Date of Patent: Jun. 26, 2018

(54) POROUS GRAPHENE, GRAPHENE QUANTUM DOT AND GREEN PREPARATION METHOD FOR POROUS GRAPHENE AND GRAPHENE QUANTUM DOT

(71) Applicant: SOUTH CHINA UNIVERSITY OF TECHNOLOGY, Tianhe Guangzhou (CN)

(72) Inventors: Xiaoying Wang, Tianhe Guangzhou (CN); Xiaoyun Li, Tianhe Guangzhou (CN); Runcang Sun, Tianhe Guangzhou (CN); Weijie Ye, Tianhe Guangzhou (CN); Weimin Chen, Tianhe Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 0 days. days.

(21) Appl. No.: 15/563,406

(22) PCT Filed: Dec. 31, 2015

(86) PCT No.: PCT/CN2015/100021
§ 371 (c)(1),
(2) Date: Sep. 29, 2017

(87) PCT Pub. No.: WO2016/155396
PCT Pub. Date: Oct. 6, 2016

(65) Prior Publication Data
US 2018/0086976 A1 Mar. 29, 2018

(30) Foreign Application Priority Data

Mar. 31, 2015 (CN) .......................... 2015 1 0150669
Dec. 11, 2015 (CN) .......................... 2015 1 0915456

(51) Int. Cl.
*C01B 32/20* (2017.01)
*C09K 11/65* (2006.01)
(Continued)

(52) U.S. Cl.
CPC ............... *C09K 11/65* (2013.01); *B01J 21/18* (2013.01); *B82Y 30/00* (2013.01); *C01B 32/205* (2017.08)

(58) Field of Classification Search
CPC ........ C09K 11/65; B01J 21/18; C01B 32/205; B82Y 30/00
See application file for complete search history.

(56) References Cited

FOREIGN PATENT DOCUMENTS

| CN | 102115069 A | 7/2011 |
|---|---|---|
| CN | 102225758 A | 10/2011 |

(Continued)

OTHER PUBLICATIONS

Wang, Zhenbing, Xincong Lv, and Jian Weng. "High peroxidase catalytic activity of exfoliated few-layer graphene." Carbon 62 (2013):51-60.*

(Continued)

*Primary Examiner* — Richard M Rump
(74) *Attorney, Agent, or Firm* — Maier & Maier, PLLC

(57) ABSTRACT

A porous graphene, a graphene quantum dot and a green preparation method for the porous graphene and the graphene quantum dot. The method includes adding a starting material, graphite, into an acetic acid aqueous solution of chitosan, using chitosan as a stripping agent, obtaining the porous graphene by an ultrasonic treatment, centrifugation and precipitation, and obtaining the graphene quantum dot by dialyzing a supernatant from the centrifugation. The obtained porous graphene has fewer layers and a larger lateral dimension of sheet. The obtained graphene quantum dot has good dispersity and a uniform particle size distri- (Continued)

bution. The preparation method is simple to perform and a graphitization degree of the prepared porous graphene and graphene quantum dot is high. The obtained porous graphene can be used as a carrier for a reverse gene transfection, and the graphene quantum dot can be used for cell imaging.

8 Claims, 3 Drawing Sheets

(51) Int. Cl.
    *B82Y 30/00*    (2011.01)
    *B01J 21/18*    (2006.01)
    *C01B 32/205*   (2017.01)

(56) References Cited

FOREIGN PATENT DOCUMENTS

| CN | 103112848 A | 5/2013 |
| CN | 103738941 A | 4/2014 |
| CN | 104843677 A | 8/2015 |

OTHER PUBLICATIONS

Written Opinion dated Apr. 6, 2016 of corresponding International application No. PCT/CN2015/100021; 11 pgs.
International Search Report dated Apr. 6, 2016 of corresponding International application No. PCT/CN2015/100021; 7 pgs.
Zhenbing Wang, "Graphene Prepared by Directly Exfoliating Graphite with the Aid of Chitosan and Its Application in Biosensor"; , Wanfang Data, Theses for Master's Degree of Xiamen University, Oct. 30, 2013 (Oct. 30, 2013), 2.2 Experimental Part and 2.3 Result and Discussion.

\* cited by examiner

POROUS GRAPHENE, GRAPHENE QUANTUM DOT AND GREEN PREPARATION METHOD FOR POROUS GRAPHENE AND GRAPHENE QUANTUM DOT

TECHNICAL FIELD

The present invention relates to a technical field of nanotechnology and new materials, and in particular, relates to a porous graphene, a graphene quantum dot and a green preparation method for the porous graphene and the graphene quantum dot.

BACKGROUND

Graphene materials are graphite materials in nanoscale formed by a single-layer graphite. As regards a porous graphene, a number of pores in nanoscale are prepared on graphene sheets by using a physical or chemical method. A porous structure makes graphene advantageous in aspects of energy, catalytic or adsorption materials.

At present, the graphene material with porous structure is prepared by the mainly following methods: (1) adding a multi-layer graphene and a surfactant into a strong alkaline aqueous solution for a hydrothermal reaction, which however introduces many functional groups into the graphene sheets due to an addition of the surfactant; (2) simultaneously heating a carbon material such as graphene and a transition metal to obtain the porous graphene, however the transition metal used in such method is expensive; (3) obtaining the graphene sheets by a chemical deposition method and then forming the porous graphene by means of etching, which however is complicated in process and has a high cost; and (4) mixing graphite with nano metal particles, and obtaining the porous graphene material by dissolving with an acid, which however increases a cost of the reaction due to an introduction of nano metals. In the present invention, by means of an ultrasonic treatment in one step, the porous graphene is prepared and a graphene quantum dot is obtained simultaneously. Such method is simple to perform and has a low cost. Further, by this method, the porous graphene having a high degree of graphitization, fewer layers and a larger lateral dimension of sheet is obtained.

In addition to the excellent properties of graphene, the graphene quantum dot further exhibits a series of new properties due to the quantum confinement effect and the boundary effect. The preparation methods for the graphene quantum dot are categorized into two types, a top-down method and a down-top method. The top-down method mainly includes a hydrothermal method, an electrochemical method and a chemical peeled carbon fiber method. A starting material used in these methods is generally graphene oxide or reduced graphene oxide. During the preparation, a strong oxidant or a toxic reagent is used. The down-top method mainly includes a solution chemical method, an ultrasonic wave method, a microwave method and a controllable thermal degradation of polycyclic aromatic hydrocarbon, wherein small molecules are used as a carbon source to prepare a carbon quantum dot. An ultrasonic etching method is also one of the top-down methods. At present, there is no report teaching preparation of the porous graphene and the graphene quantum dot by means of the ultrasonic treatment in one step with graphite as the starting material.

SUMMARY OF THE INVENTION

An object of the present invention is to provide a porous graphene, a graphene quantum dot and a green preparation method for the porous graphene and the graphene quantum dot. The method is simple to perform, and a starting material (graphite) is easy to obtain. The obtained porous graphene has a uniform pore size distribution and a larger lateral dimension of sheet. The obtained graphene quantum dot has good crystal form and a uniform size distribution. The obtained porous graphene can be used as a carrier for a reverse gene transfection, and the graphene quantum dot can be used for cell imaging.

The present invention is realized by the following technical solutions:

A green preparation method for the porous graphene and the graphene quantum dot, comprises the following steps:
1) dissolving chitosan into an acetic acid aqueous solution to obtain an acetic acid aqueous solution of chitosan;
2) adding graphite into the acetic acid aqueous solution of chitosan, and stirring and mixing uniformly to obtain a mixed solution;
3) placing the mixed solution into an ultrasonic cleaner for an ultrasonic treatment; and
4) centrifuging and precipitating the mixed solution after the ultrasonic treatment to obtain the porous graphene, and a supernatant from centrifugation being dialyzed to obtain the graphene quantum dot.

Further, a mass ratio of chitosan to graphite is from 1:10 to 10:1.

Further, in step 1), a weight average molecular weight of chitosan is from $5.0 \times 10^3$ to $1.0 \times 10^6$, and a degree of deacetylation is from 40% to 95%.

Further, in step 1), a volume concentration of acetic acid in the acetic acid aqueous solution is from 0.5% to 4%, and a mass concentration of the acetic acid aqueous solution of chitosan is from 0.1 mg/mL to 0.5 mg/mL.

Further, in step 3), a temperature of the ultrasonic treatment is from 10° C. to 75° C., a power of the ultrasonic treatment is from 420 W to 600 W, and a duration of the ultrasonic treatment is from 0.5 hour to 24 hours.

More further, in step 4), the mixed solution is centrifuged at a rate from 1000 rpm to 2000 rpm for 5 to 10 minutes.

Further, in step 4), a product obtained after the centrifugation is further centrifugally washed with the acetic acid aqueous solution in a volume concentration of acetic acid of 0.5% to 4% at a rate of 15000 to 20000 rpm for 1.5 hours to 3 hours, and the porous graphene is obtained as precipitate after being centrifuged.

Further, in step 4), the supernatant from the centrifugation is dialyzed by using a dialysis bag with a molecular weight cutoff of 3000 to 10000, and a substance obtained via the dialysis is the graphene quantum dot.

A porous graphene prepared by the above preparation method is provided; wherein the porous graphene has a sheet thickness of 0.5 nm to 2 nm and a lateral dimension of 1 micron to 30 microns, and the porous graphene has uniformly distributed pores on surface with a pore size of 10 nm to 500 nm.

A graphene quantum dot prepared by the above preparation method is provided; wherein the graphene quantum dot has a thickness of 0.5 nm to 1.5 nm and a particle size of 3 nm to 7 nm.

Compared with the prior art, the present invention has the following advantages:

Since the ultrasonic treatment is only used in the present invention, the preparation method is simple to perform and the starting materials are easy to obtain. The porous graphene prepared by the method according to the present invention has a high degree of graphitization, uniform pore size distribution, the sheet thickness of 0.5 nm to 2 nm, larger lateral dimension of sheet of 1 micron to 30 microns and a diameter of a sheet pore of 10 nm to 500 nm. The obtained graphene quantum dot has good crystal form, uniform size distribution, the thickness of 0.5 nm to 1.5 nm and the particle size of 3 nm to 7 nm.

DETAILED DESCRIPTION OF THE PREFERRED EMBODIMENT

Figure 1:
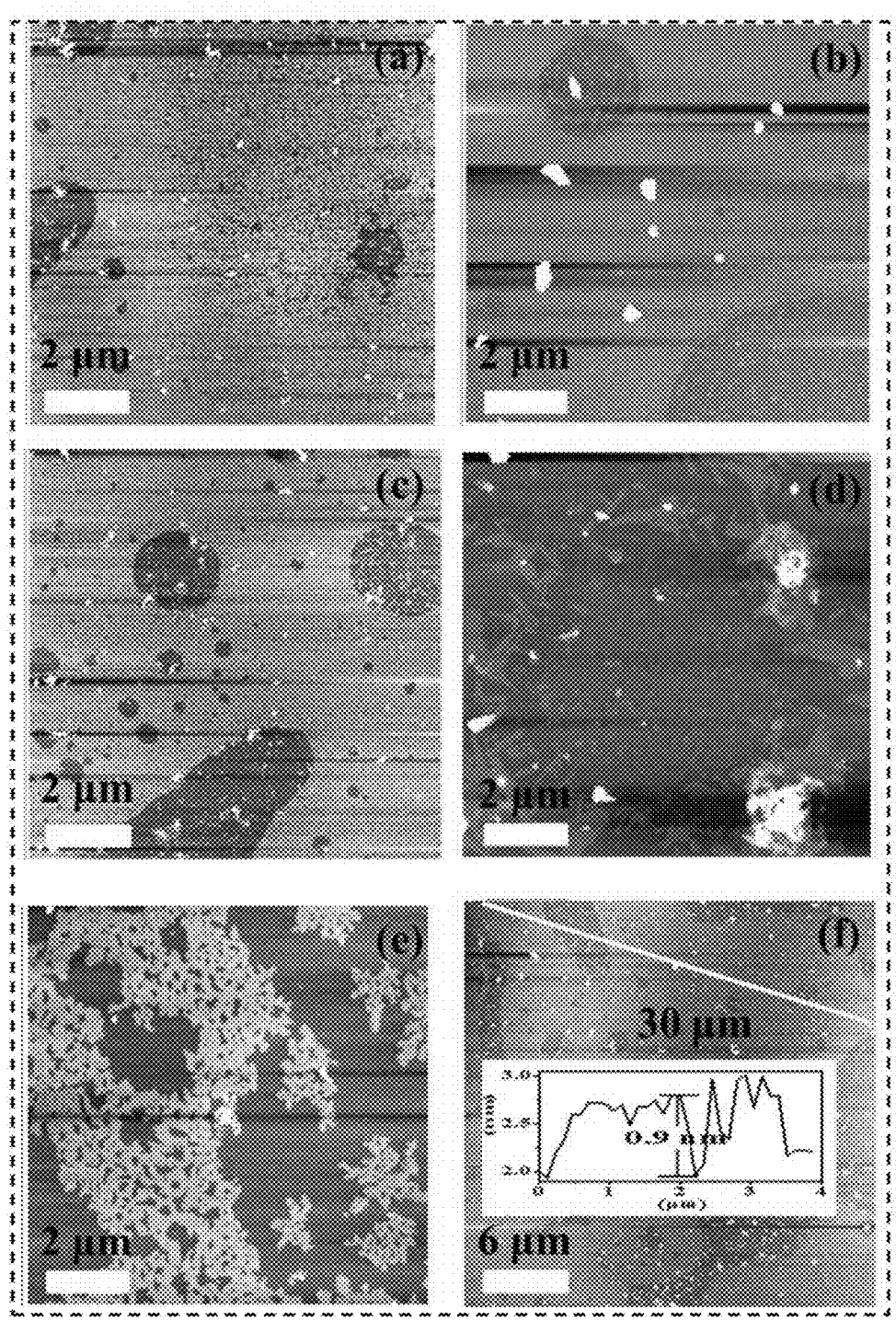
In FIG. 1, (a) to (e) are atomic force micrographs of a porous graphene obtained by subjecting graphene to an ultrasonic treatment for 0.5 hour, 2 hours, 8 hours, 16 hours and 24 hours respectively; and in FIG. 1, (f) is an atomic force micrograph and a height diagram of a large-size porous graphene obtained by the ultrasonic treatment for 8 hours.

The present invention is further described with reference to the specific embodiments. However, the present invention is not limited to such embodiments. It should be noted that unless otherwise specified hereinafter, these embodiments may all be realized by a person skilled in the art with reference to the prior art.

Embodiment 1

An acetic acid aqueous solution with a volume concentration of acetic acid of 0.5% was prepared, chitosan having a weight average molecular weight of $5.0 \times 10^3$ and a degree of deacetylation of 40% was dissolved in the acetic acid aqueous solution to obtain a chitosan solution having a mass concentration of 0.1 mg/mL, and then the chitosan solution was stirred uniformly;

500 mg of graphite was added into the above-mentioned chitosan solution to obtain a mixed solution, and a mass ratio of chitosan to graphite was controlled as 1:10; and the mixed solution was placed into an ultrasonic cleaner for an ultrasonic treatment, with a temperature of 75° C., a duration of 0.5 hour and an ultrasonic power of 600 W.

The mixed solution after the ultrasonic treatment was then centrifuged at a rate of 1000 rpm for 10 minutes, and then was centrifugally washed with the acetic acid aqueous solution having the volume concentration of 0.5% at a rate of 15000 rpm for 0.5 hour. Precipitate obtained via centrifugation was a porous graphene; and a supernatant from the centrifugation was dialyzed using a dialysis bag with a molecular weight cutoff of 10000, and a substance obtained via the dialysis was a graphene quantum dot.

Embodiment 2

An acetic acid aqueous solution with a volume concentration of acetic acid of 2% was prepared, chitosan having a weight average molecular weight of $2.0 \times 10^4$ and a degree of deacetylation of 53% was dissolved in the acetic acid aqueous solution to obtain a chitosan solution having a mass concentration of 0.2 mg/mL, and then the chitosan solution was stirred uniformly;

200 mg of graphite was added into the above-mentioned chitosan solution to obtain a mixed solution, and a mass ratio of chitosan to graphite was controlled as 1:5; and the mixed solution was placed into the ultrasonic cleaner for an ultrasonic treatment, with a temperature of 60° C., a duration of 2 hours, and an ultrasonic power of 540 W.

The mixed solution after the ultrasonic treatment was then centrifuged at a rate of 2000 rpm for 10 minutes, and then was centrifugally washed with the acetic acid aqueous solution having the volume concentration of 2% at a rate of 20000 rpm for 1 hour. Precipitate obtained via centrifugation was the porous graphene; and a supernatant from the centrifugation was dialyzed using a dialysis bag with a molecular weight cutoff of 5000, and a substance obtained via the dialysis was the graphene quantum dot.

Embodiment 3

An acetic acid aqueous solution with a volume concentration of acetic acid of 4% was prepared, chitosan having a weight average molecular weight of $1.5 \times 10^5$ and a degree of deacetylation of 60% was dissolved in the acetic acid aqueous solution to obtain a chitosan solution having a mass concentration of 0.5 mg/mL, and then the chitosan solution was stirred uniformly;

100 mg of graphite was added into the above-mentioned chitosan solution to obtain a mixed solution, and a mass ratio of chitosan to graphite was controlled as 1:1; and the mixed solution was placed into the ultrasonic cleaner for an ultrasonic treatment, with a temperature of 30° C., a duration of 8 hours, and an ultrasonic power of 480 W.

The mixed solution after the ultrasonic treatment was then centrifuged at a rate of 2000 rpm for 5 minutes, and then was centrifugally washed with the acetic acid aqueous solution having the volume concentration of 4% at a rate of 16000 rpm for 1.5 hours. Precipitate obtained via centrifugation was the porous graphene; and a supernatant from the centrifugation was dialyzed using a dialysis bag with a molecular weight cutoff of 3000, and a substance obtained via the dialysis was the graphene quantum dot.

Embodiment 4

An acetic acid aqueous solution with a volume concentration of acetic acid of 0.5% was prepared, chitosan having a weight average molecular weight of $4.5 \times 10^5$ and a degree of deacetylation of 80% was dissolved in the acetic acid aqueous solution to obtain a chitosan solution having a mass concentration of 0.2 mg/mL, and then the chitosan solution was stirred uniformly;

100 mg of graphite was added into the above-mentioned chitosan solution to obtain a mixed solution, and a mass ratio of chitosan to graphite was controlled as 5:1; and the mixed solution was placed into the ultrasonic cleaner for an ultrasonic treatment, with a temperature of 10° C., a duration of 16 hours, and an ultrasonic power of 420 W.

The mixed solution after the ultrasonic treatment was then centrifuged at a rate of 1000 rpm for 10 minutes, and then was centrifugally washed with the acetic acid aqueous solution having the volume concentration of 0.5% at a rate of 18000 rpm for 2 hours. Precipitate obtained via centrifugation was the porous graphene; and a supernatant from the centrifugation was dialyzed using a dialysis bag with a molecular weight cutoff of 10000, and a substance obtained via the dialysis was the graphene quantum dot.

Example 5

An acetic acid aqueous solution with a volume concentration of acetic acid of 0.5% was prepared, chitosan having a weight average molecular weight of $1.0 \times 10^6$ and a degree of deacetylation of 95% was dissolved in the acetic acid aqueous solution to obtain a chitosan solution having a mass concentration of 0.2 mg/mL, and then the chitosan solution was stirred uniformly;

50 mg of graphite was added into the above-mentioned chitosan solution to obtain a mixed solution, and a mass ratio of chitosan to graphite was controlled as 10:1; and the mixed solution was placed into the ultrasonic cleaner for an ultrasonic treatment, with a temperature of 30° C., a duration of 24 hours, and an ultrasonic power of 600 W.

The mixed solution after the ultrasonic treatment was then centrifuged at a rate of 2000 rpm for 10 minutes, and then was centrifugally washed with the acetic acid aqueous solution having the volume concentration of 0.5% at a rate of 15000 rpm for 3 hours. Precipitate obtained via centrifugation was the porous graphene; and a supernatant from the centrifugation was dialyzed using a dialysis bag with a molecular weight cutoff of 10000, and a substance obtained via the dialysis was the graphene quantum dot.

FIG. 1 illustrates that size of a pore structure of the graphene varied with the duration of the ultrasonic treatment. Particularly, in FIG. 1, (a) to (e) are atomic force micrographs of the porous graphene obtained by subjecting graphene to the ultrasonic treatment for 0.5 hour, 2 hours, 8 hours, 16 hours and 24 hours respectively. Through comparison, it is found that as the duration of the ultrasonic treatment was prolonged, the pore structure became larger, with the size from 10 nm to 500 nm. In FIG. 1, (f) and an inset thereof are an atomic force micrograph and a height diagram of a large-size porous graphene obtained by the ultrasonic treatment for 8 hours. As seen from a mark-up line in (f), a lateral dimension of a graphene sheet reaches 30 microns, and as seen from a curve in the inset in (f), the graphene sheet has a thickness of 0.9 nm.

Figure 2:
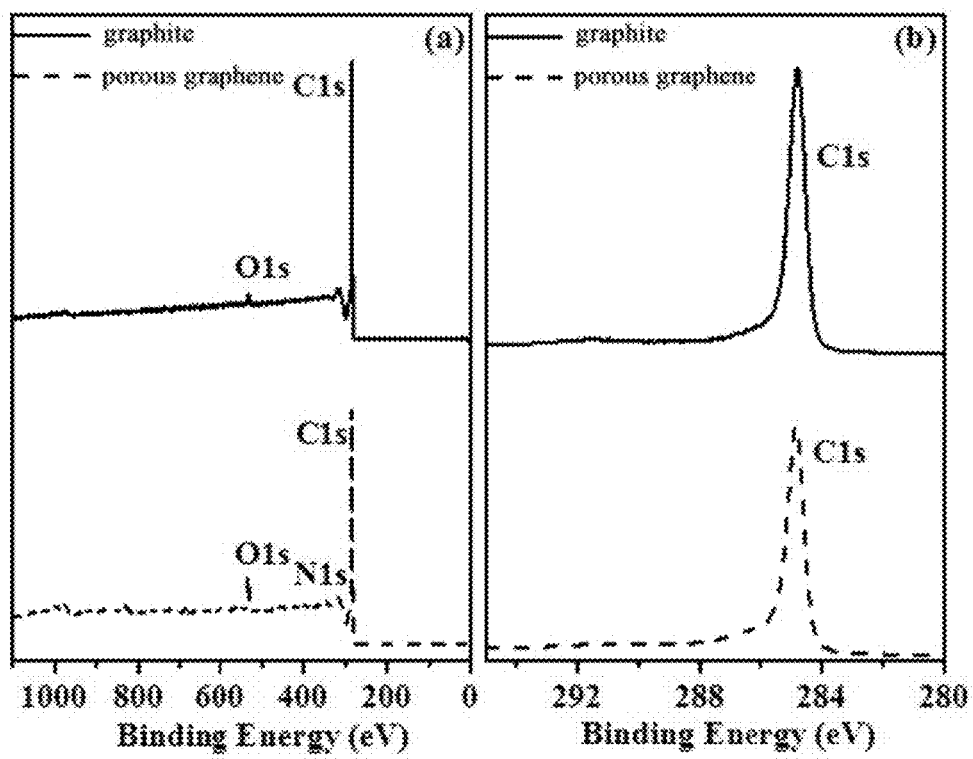
in FIGS. 2, (a) and (b) are X-ray photoelectron spectroscopies of graphite and the porous graphene prepared in Embodiment 3.

In FIGS. 2, (a) and (b) are X-ray photoelectron spectroscopies of graphite and the porous graphene prepared in Embodiment 3. As seen from the figures, the porous graphene prepared in Embodiment 3 has fewer oxygen-containing functional groups and has a high degree of graphitization. The X-ray photoelectron spectroscopies of the porous graphene prepared in other embodiments are substantially the same as that of the porous graphene prepared in Embodiment 3.

Figure 3:
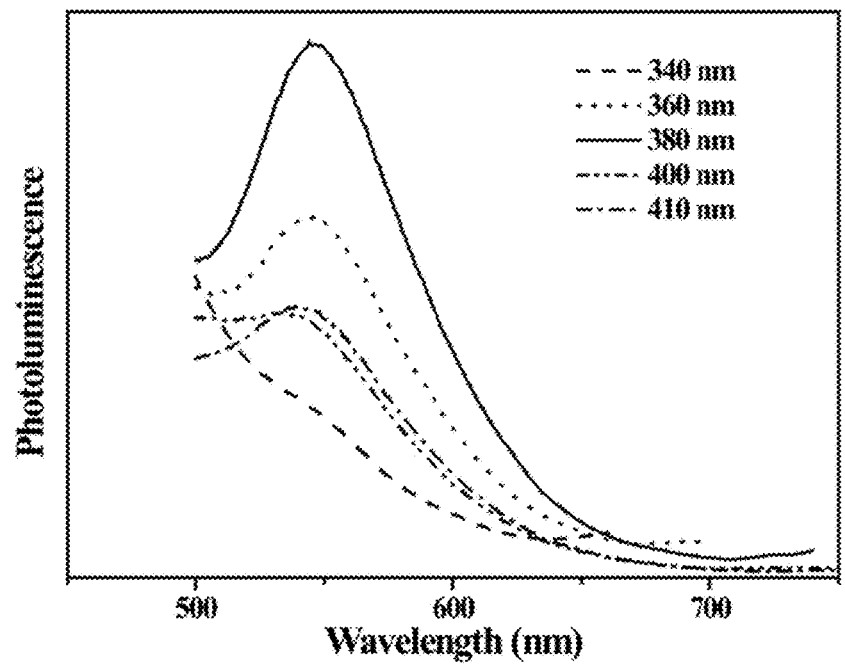
FIG. 3 is a photoluminescence spectrum of a graphene quantum dot prepared in Embodiment 3 which was excited at different wavelengths; and in FIG. 4, (a) is a TEM photo of the graphene quantum dot prepared in Embodiment 3; and (b) and (c) are an atomic force micrograph and a height diagram of the graphene quantum dot prepared in Embodiment 3 respectively.

FIG. 3 is a photoluminescence spectrum of the graphene quantum dot prepared in Embodiment 3 at different excitation wavelengths. It can be seen from the figure that as the excitation wavelength changed, a position of an emission peak of the obtained graphene quantum dot remain substantially unchanged. At an excitation wavelength of 380 nm, the graphene quantum dot emitted strong fluorescence, with a fluorescence spectroscopy peak at 546 nm.

Figure 4:
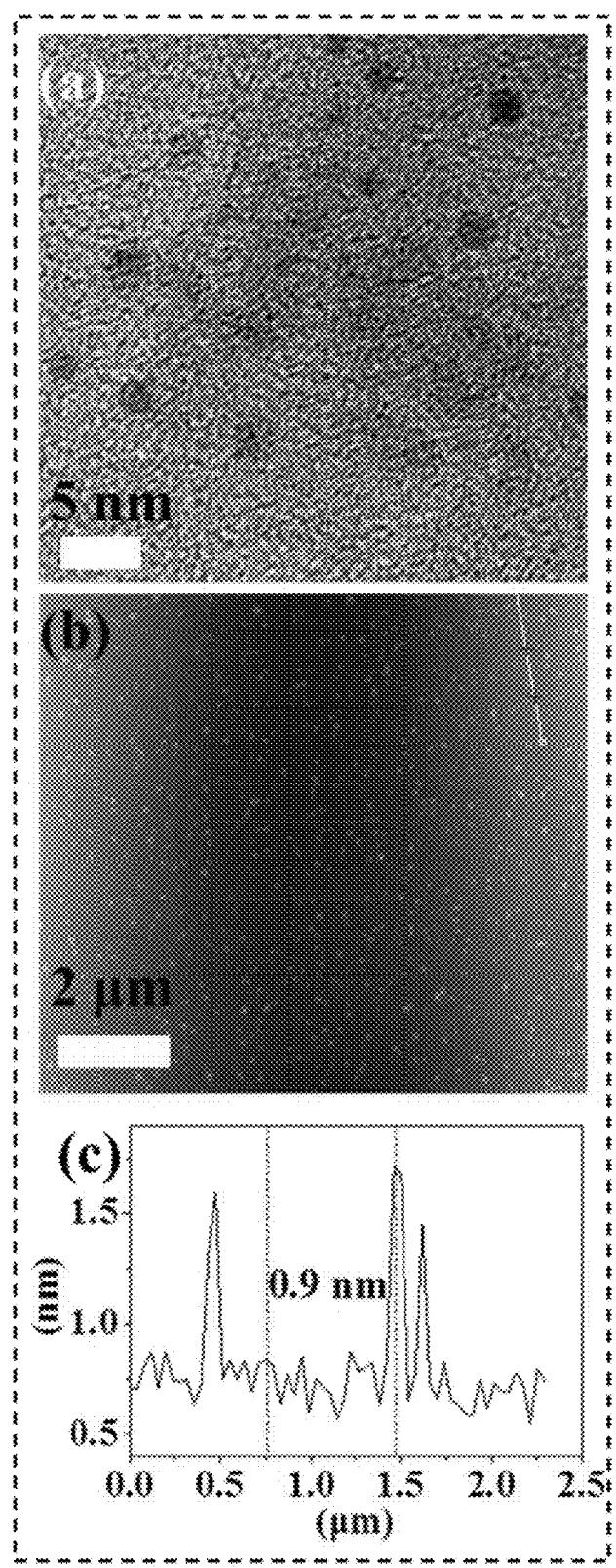

FIG. 4 illustrates a TEM photo of the graphene quantum dot prepared in Embodiment 3. As seen from the figure, the graphene quantum dot has a particle size between 3 nm and 7 nm. The graphene quantum dot has a good crystallinity, and a lattice fringe could be apparently observed. In FIG. 4, (b) is an atomic force micrograph of the graphene quantum dot prepared in Embodiment 3, and (c) is a height diagram corresponding to a part marked by a line in (b). It can be seen that the graphene quantum dot has a height of 0.9 nm. The TEM photos, the atomic force micrographs and the height diagrams of the graphene quantum dots prepared in other embodiments are substantially the same as those of the graphene quantum dot prepared in Embodiment 3.

What is claimed:
1. A green preparation method for a porous graphene and a graphene quantum dot, comprising the following steps:
   1) dissolving chitosan into an acetic acid aqueous solution to obtain an acetic acid aqueous solution of chitosan;
   2) adding graphite into the acetic acid aqueous solution of chitosan, and stirring and mixing uniformly to obtain a mixed solution;
   3) placing the mixed solution into an ultrasonic cleaner for an ultrasonic treatment; and
   4) centrifuging and precipitating the mixed solution after the ultrasonic treatment to obtain the porous graphene, and a supernatant from centrifugation being dialyzed to obtain the graphene quantum dot.

2. The green preparation method for the porous graphene and the graphene quantum dot according to claim 1, wherein a mass ratio of chitosan to graphite is from 1:10 to 10:1.

3. The green preparation method for the porous graphene and the graphene quantum dot according to claim 1, wherein in step 1), a weight average molecular weight of chitosan is from $5.0 \times 10^3$ to $1.0 \times 10^6$, and a degree of deacetylation is from 40% to 95%.

4. The green preparation method for the porous graphene and the graphene quantum dot according to claim 1, wherein in step 1), a volume concentration of acetic acid in the acetic acid aqueous solution is from 0.5% to 4%, and a mass concentration of the acetic acid aqueous solution of chitosan is from 0.1 mg/mL to 0.5 mg/mL.

5. The green preparation method for the porous graphene and the graphene quantum dot according to claim 1, wherein in step 3), a temperature of the ultrasonic treatment is from 10° C. to 75° C., a power of the ultrasonic treatment is from 420 W to 600 W, and a duration of the ultrasonic treatment is from 0.5 hour to 24 hours.

6. The green preparation method for the porous graphene and the graphene quantum dot according to claim 1, wherein in step 4), the mixed solution is centrifuged at a rate from 1000 rpm to 2000 rpm for 5 to 10 minutes.

7. The green preparation method for the porous graphene and the graphene quantum dot according to claim 1, wherein in step 4), a product obtained after the centrifugation is further centrifugally and washed with the acetic acid aqueous solution in a volume concentration of acetic acid of 0.5% to 4% at a rate of 15000 rpm to 20000 rpm for 1.5 hours to 3 hours, and the porous graphene is obtained as precipitate after being centrifuged.

8. The green preparation method for the porous graphene and the graphene quantum dot according to claim 1, wherein in step 4), the supernatant from the centrifugation is dialyzed by using a dialysis bag with a molecular weight cutoff of 3000 to 10000, and a substance obtained via dialysis is the graphene quantum dot.

* * * * *